United States Patent
Hu et al.

(10) Patent No.: US 10,749,912 B2
(45) Date of Patent: Aug. 18, 2020

(54) REMOTE LIVE SUPPORT TOOL

(71) Applicant: ABB Technology Oy, Helsinki (FI)

(72) Inventors: Zhongliang Hu, Espoo (FI); Teemu Tanila, Espoo (FI)

(73) Assignee: ABB Schweiz AG, Baden (CH)

( * ) Notice: Subject to any disclaimer, the term of this patent is extended or adjusted under 35 U.S.C. 154(b) by 51 days.

(21) Appl. No.: 15/727,298

(22) Filed: Oct. 6, 2017

(65) Prior Publication Data

US 2018/0159904 A1    Jun. 7, 2018

(30) Foreign Application Priority Data

Oct. 6, 2016  (EP) .................................... 16192569

(51) Int. Cl.
| | |
|---|---|
| G06F 15/16 | (2006.01) |
| H04L 29/06 | (2006.01) |
| G06Q 10/00 | (2012.01) |
| G06Q 50/04 | (2012.01) |
| H04L 29/08 | (2006.01) |
| H04L 12/24 | (2006.01) |
| H04L 12/58 | (2006.01) |

(52) U.S. Cl.
CPC ......... *H04L 65/1069* (2013.01); *G06Q 10/20* (2013.01); *G06Q 50/04* (2013.01); *H04L 29/08099* (2013.01); *H04L 41/5061* (2013.01); *H04L 51/04* (2013.01); *H04L 67/025* (2013.01); *Y02P 90/30* (2015.11)

(58) Field of Classification Search
CPC . H04L 41/5061; H04L 51/04; H04L 65/1069; H04L 29/08099; H04L 67/025; H04L 65/1066; G06Q 10/20; G06Q 50/04; G06Q 30/016; G05B 23/00; Y02P 90/30

USPC ................ 709/204, 205, 217, 219, 227
See application file for complete search history.

(56) References Cited

U.S. PATENT DOCUMENTS

| | | | | |
|---|---|---|---|---|
| 2004/0073654 | A1* | 4/2004 | Sarma ................. | G06F 11/2294 709/224 |
| 2007/0095354 | A1* | 5/2007 | Churchill ............... | A61B 90/00 128/897 |
| 2012/0005390 | A1* | 1/2012 | Hoang .................. | H04L 67/025 710/311 |
| 2012/0309351 | A1* | 12/2012 | Dutta ..................... | G06Q 10/20 455/411 |
| 2013/0218783 | A1* | 8/2013 | Anand .................. | G06Q 10/20 705/304 |

(Continued)

FOREIGN PATENT DOCUMENTS

| | | |
|---|---|---|
| CN | 104067591 A | 9/2014 |
| CN | 105989222 A | 10/2016 |

(Continued)

OTHER PUBLICATIONS

European Search Report EP 16192569, ABB Technology Oy, dated Jan. 19, 2017, 2 pages.

(Continued)

*Primary Examiner* — Liang Che A Wang
*Assistant Examiner* — Johnny B Aguiar
(74) *Attorney, Agent, or Firm* — Taft Stettinius & Hollister LLP; J. Bruce Schelkopf (57) ABSTRACT

To facilitate remote support, a live remote support tool providing versatile information exchange between an apparatus at a site and another apparatus in a remote support site is disclosed.

14 Claims, 3 Drawing Sheets

(56) References Cited

U.S. PATENT DOCUMENTS

2014/0115487 A1* 4/2014 Sandler .............. H04M 1/7253
                                                  715/740
2014/0344913 A1   11/2014 Ståhl
2016/0173816 A1*  6/2016 Huenerfauth .......... G06Q 10/20
                                                  348/14.02

FOREIGN PATENT DOCUMENTS

WO     2012166694 A1   12/2012
WO     2015023443 A1    2/2015

OTHER PUBLICATIONS

China National Intellectual Property Administration, Notification of the First Office Action issued in corresponding Chinese application No. 201710914820.5, dated Mar. 20, 2020, 23 pp.

* cited by examiner

FIG.6

REMOTE LIVE SUPPORT TOOL

RELATED APPLICATIONS

This application claims priority to European patent application no. 16192569.8, filed on Oct. 6, 2016, the contents of which is hereby incorporated herein by reference in its entirety.

FIELD

The present invention relates to remote service support.

BACKGROUND ART

The evolvement of communication technology, particularly wireless communication technology and end user devices, has enabled versatile communication possibilities and introduction of different services. An example of such a service is a remote support for maintenance staff of machines and equipment. There are smartphone applications that allow a user of the smartphone to receive service recommendations for a machine, store operational data on the machine over the network connection, and troubleshoot the machine, for example, from a service center.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide methods, apparatuses, a system and a computer program product for providing possibility to obtain a live support from a remote service operator.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

The present invention is applicable to any piece of a system and the system that comprises one or more service centers or service desk equipment configurable to transmit instructions and recommendations to a remote user apparatus. In the following, maintenance is used as an example of a remote service without restricting the examples to the maintenance.

Figure 1:
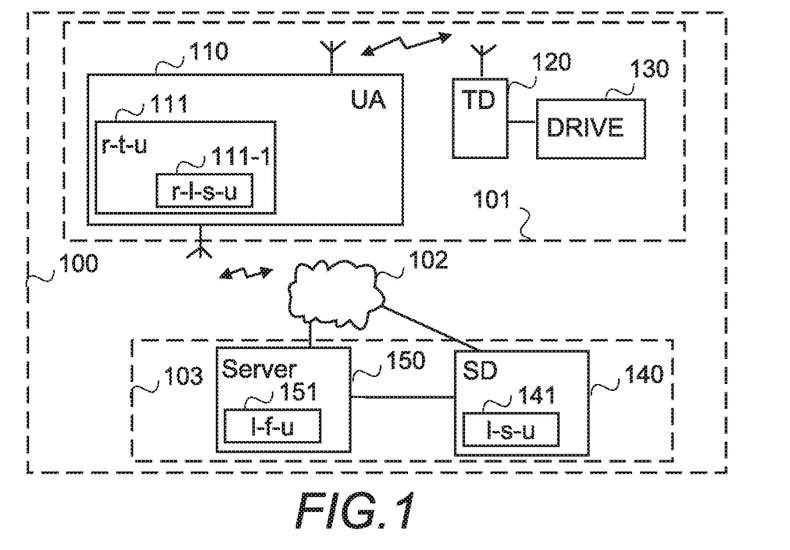
FIG. 1 shows simplified architecture of a system and block diagrams of some apparatuses according to an exemplary embodiment.

An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system may comprise any number of shown elements, other equipment, other functions and structures that are not illustrated.

In the embodiment illustrated in FIG. 1, the system 100 comprises one or more industrial sites 101 (only one illustrated in FIG. 1) connected over one or more networks 102 to one or more service centers 103 (only one illustrated in FIG. 1) and to one or more service desks 140 (only one illustrated in FIG. 1) either directly over one or more networks 102 or via the service center.

In the illustrated example the industrial site 101 comprises a user apparatus 110 of a remote user as visiting equipment, and a terminal device 120 and a drive 130 as permanent equipments. The permanent equipment means herein equipment that is intended to locate in the industrial site a long time, whereas the visiting equipment means equipment that is intended to visit the industrial site temporarily. However, it should be appreciated that the user apparatus 110 may be permanent equipment as well. Further, it should be appreciated that the terminal device and the drive depicts herein any device, machine, equipment, system and a process that whose operations and/or service and/or maintenance may be taken care remotely. Other examples of such equipment include frequency converters, alternating current/direct current (AC/DC) modules, direct current/alternating current (DC/AC) modules, programmable logic controllers, switches, motion controllers or motion drives, servo motors, soft starters, robots, cars, and heavy equipment, etc. It should be appreciated that in the above only some examples are listed.

The user apparatus 110 refers to a computing device (equipment), that may be a non-portable device or a portable device (mobile device), and it may also be referred to as a user terminal or user device. Portable computing devices (apparatuses) include wireless mobile communication devices operating with or without a subscriber identification module (SIM) in hardware or in software, including, but not limited to, the following types of devices: mobile phone, smart-phone, personal digital assistant (PDA), laptop and/or touch screen computer, tablet (tablet computer), multimedia device, wearable computer and other types of wearable devices, such as clothing and accessories incorporating computer and advanced electronic technologies. The user apparatus 110 is configured to support remote maintenance. For that purpose the user apparatus 110 comprises a remote support application provided by a remote tool unit (r-t-u) 111 (may also be called a remote support tool unit), and its sub-unit remote live support unit (r-l-s-u) 111-1 whose functionality will be described in more detail below with FIGS. 2 and 3.

In the illustrated example the user apparatus has at least two communications interfaces, depicted by 2 antennas, one to connect to the service center 103 wirelessly over one or more networks 102 and one to connect to the terminal device 120 over a local connection. The wireless connection to the service center may be provided by any mobile system, such as Global System for Mobile communications (GSM), General Packet Radio Service (GPRS), Long-Term Evolution (LTE), 4G, 5G and beyond, or a combination of a mobile system and a fixed system, like Wi-Fi or Li-Fi providing access to internet and via internet to the service center. The local connection may be provided naturally over a mobile system but it may be provided by a direct connection, for example using Bluetooth, or by a local network, like Wi-Fi or Li-Fi. It should be appreciated that the user apparatus 110 is depicted to include 2 antennas only for the sake of clarity. The number of reception and/or transmission antennas, or other communication interfaces, may naturally vary according to a current implementation, and the user apparatus type.

The terminal device 120 refers herein to equipment via which parameters of the drive 130 may be adjusted or acquired, and the functions of the drive 130 otherwise controlled by a person located on the site and/or remotely from the service center. In other words, the terminal device is a module providing at least a wireless interface to which the user apparatus may connect to. The terminal device 120 may be a separate device (as in the illustrated example), or a device detachable connectable to the drive, or equipment integrated to the drive. At the simplest the terminal device may be the mere wireless interface. Other examples of the terminal device include a control panel, smartphone, mobile phone, tablet or laptop computer. At least in the solutions in which the terminal device 120 is not integrated with the drive 130, the terminal device 120 may be located on-site at a close proximity of the drive 130 to which a connection may be provided via a communication interface by Bluetooth, Near-field communication (NFC), WiFi, Li-Fi, and/or inductive connection (such as an inductive connection according to an inductive power standard (Qi) by the Wireless Power Consortium), for example.

In the illustrated example of FIG. 1 the drive 130 is equipment performing the functionality of a drive according to its settings and has a communication interface via which its parameters may be adjusted or acquired by means of the terminal device 120.

The one or more networks 102 (communications networks) may comprise one or more wireless networks, wherein a wireless network may be based on any mobile system, such as GSM, GPRS, LTE, 4G, 5G and beyond, or a wireless local area network, such as Wi-Fi, Li-Fi. Further, the one or more networks 102 may comprise one or more fixed networks and internet.

In the illustrated example the service center 103 comprises a service desk 140 and a server 150. The service desk 140 may be any combination of any user interface, like touch screen or combination of a display and a keypad, and any computing apparatus. Examples of such apparatuses include a work station, a laptop computer, a personal computer, a wearable computer and a display connected to the server 150. The service desk 140 is configured to support the live remote maintenance. For that purpose the service desk 140 comprises a live support unit (l-s-u) 141 whose functionality will be described in more detail below, and a connection to the server 150. The service desk 140 may be configured to have a connection to the site via the server and/or over one or more networks 102, and the network(s) used may be different than those used by the server 150.

The server 150, like a cloud server or a grid server, refers herein to a combination of a data storage and a data management system. The data storage may be any kind of conventional or future data repository, including distributed and centralized storing of data, a cloud-based storage in a cloud environment, managed by any suitable management system. The implementation of the data storage, the manner how data is stored, retrieved and updated are irrelevant to the invention, and therefore not described in detail here. The server 150 is configured to support the live remote maintenance. For that purpose the server 150 comprises a live feed unit (l-f-u) 151 whose functionality will be described in more detail below, a connection to service desks 150 and a connection over the one or more networks 102 to the site.

Figure 2:
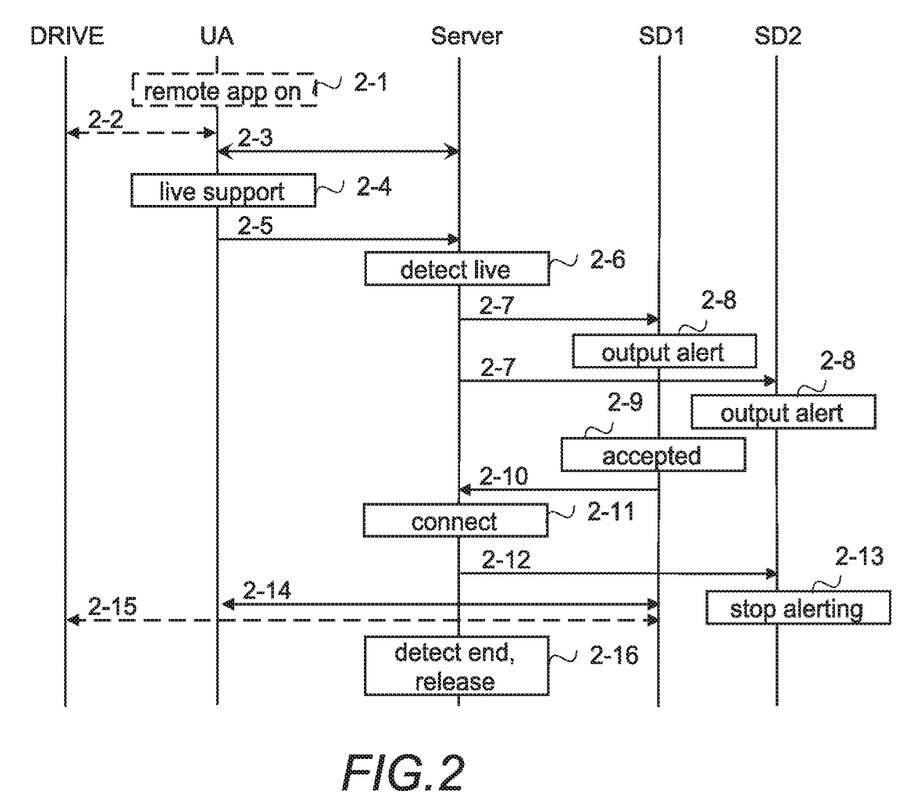
FIG. 2 illustrates exemplary information exchange.

FIG. 2 illustrates information exchange in an exemplary situation in which a remote live session is established between a user of a user apparatus UA in a site, and an operator of a service desk SD1, the remote live session being established via a server supporting remote maintenance for example. Further, in the illustrated example it is assumed that the terminal device is integrated into the drive, and that they function as one unit, the drive. Further, in the example it is assumed that alerting is triggered by sending a corresponding message and the alerting is continued as long as a message stopping alerting is received. However, it is a straightforward solution to implement the functionality disclosed below to a solution in which alerting is continued as long as alerting messages are received (and naturally sent) at a certain intervals. It should be appreciated that any known or future communication protocol and process to establish a session/connection may be used. Therefore they are not described in detail herein.

Referring to FIG. 2, when the user stars the remote tool application, remote app, (point 2-1), a local connection to the drive is establish (messages 2-2, denoted by a dash line) and a connection to the server (messages 2-3). The server is a back-end server to the remote tool application, and hence the server's address is known by the remote tool application. However, unlike in prior art solution, the user apparatus outputs in the remote tool application a possibility to start a live support, and once a user input selecting to start a live support session is detected in point 2-4, the remote live support unit is started and the remote live support unit causes transmission of a request for live support session in message 2-5 to the server.

The server detects in point 2-6 that instead of retrieving information or storing information, the user apparatus sent a request for a live support session. Therefore the server starts the live feed unit for the session (unless it is already running), and the live feed unit triggers session establishment by causing sending session invitations 2-7, or corresponding session establishment requests, to service desks SD1, SD2. The service desks to whom invitations 2-7 are sent may be selected freely. For example, the server, or more precisely the live feed unit, may send invitations to each service desk coupled to the server, or whose address information the server knows, or to a subset of the service desks. For example, certain sites and/or drives may be associated with certain service desks, and/or certain users may be associated with certain service desks, such association information being maintained in the server, for example, retrievable by the live feed unit.

When a service desk SD1, SD2 receives the invitation for a live support session, the live support unit is started (unless it is already running), and an alert is outputted in point 2-8 via a user interface so that an operator of the service desk may notice (see and/or hear and/or feel) the alert.

In the illustrated example the service desk SD1 receives in point 2-9 as an operator (user) input an acceptance to the invitation. In other words, the operator answered to the alert. Therefore the live support unit causes sending the acceptance in message 2-10.

Upon receiving message 2-10, the live feed unit in the server detects that SD1 accepts the session invitation, and therefore causes in point 2-11 the user apparatus and the service desk SD1 to connect to each other. Typically the connection passes via the server. However, it is possible that within the session a voice call is established directly between the user apparatus and the service desk, while the session is maintained between the user apparatus and the server, or the session is extended to be between the user apparatus and the service desk, via the service desk. For example, in a multimedia call, voice path may be over a direct connection between the user apparatus and the server, while image information, and other data information passes via the server. Further, the live feed unit informs (message 2-12) the other service desks to stop alerting. Upon receiving message 2-12 the live support unit in the service desk detects that alerting should be stopped, stops in point 2-13 the alerting, and shuts itself (unless needed for other user apparatuses).

Meanwhile the live session has been established between the service desk SD1 and the user apparatus, messages 2-14 illustrating session establishment and information exchange between them (or the live support tool and the remote live support tool). Since the user apparatus has a connection to the drive, a connection is, in the illustrated example, established also between the service desk SD1 (or the live support tool) and the drive so that the service desk SD1 has access to the drive and may obtain information directly from the drive and/or store information and/or set parameters, or service counters, etc. directly to the drive, messages 2-15 illustrating the connection establishment and information exchange between them. Preferably, if a connection is established between the service desk and the drive, via the user apparatus, the user of the user apparatus is prompted to approve access from the service desk to the drive. This provides safety against fraudulent use. However, the user apparatus, or the remote life support unit, may be configured to allow the service desk access to the drive without user approval. Further, it should be appreciated that a connection between the service desk and the drive is not necessary, and hence may not exits. The same applies to the connection between the user apparatus and the drive: a live support session may be between the user apparatus and the service desk also when there is no local connection from the user apparatus to the drive.

To have a direct connection from the user apparatus to the drive, and a direct connection from the service desk to the drive, enables versatile possibilities. For example, the user in the drive site may, while chatting with the operator, to execute a script with the drive, and after that also comment the result of that. The operator may, thanks to the direct connection to the drive, request or retrieve information from the drive directly, without first describing what he/she wants to have to the user of the user apparatus. Further, the operator may cause command(s) and/or actions to be performed, and/or scripts run on the drive without the user of the user apparatus being involved or noticing anything. However, thanks to the live support session, the operator may ask the user the end result of the "direct drive manipulation". Hence this improves the customer support quality and will decrease the malfunction time, or at least average time the drive cannot be used, hence increasing productivity.

After a while either the operator or the user provides as a user input "end the live remote session". In response to receiving, or detecting in point 2-16 information indicating to end the session, the live feed unit releases in point 2-16 the session and the connection and resources reserved for them. Further, the live feed unit may shut down, unless needed for other corresponding sessions.

Figure 3:
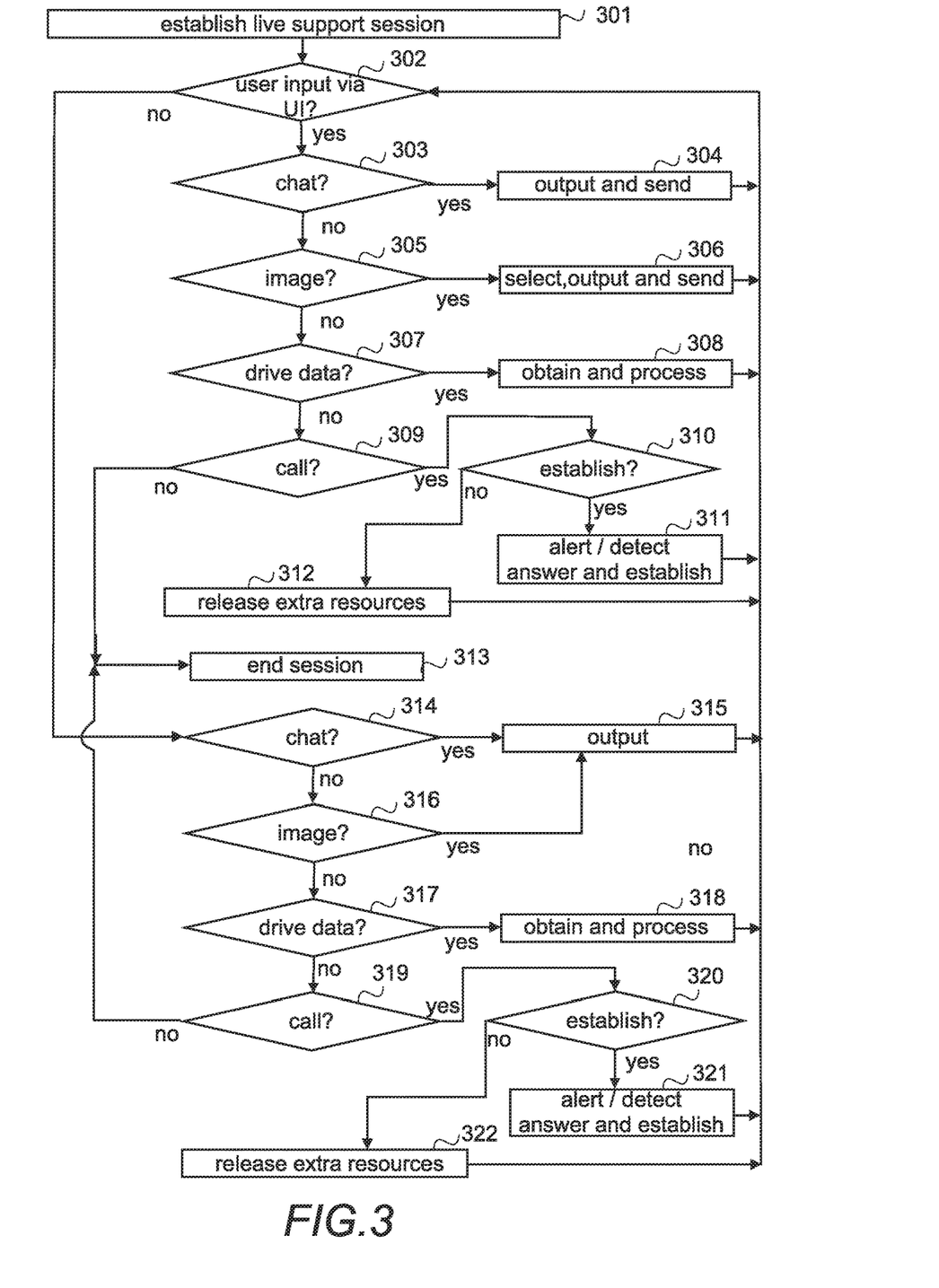
FIG. 3 is a flow chart illustrating exemplary functionality.

FIG. 3 illustrates an exemplary functionality of the remote live support unit and/or the live support unit. The functionality of the two units is similar, and hence there is no need to describe them separately. Basically the only difference between the units are that the remote live support unit is run in an apparatus in a remote site (industrial site in FIG. 1), whereas the live support unit is run in an apparatus in a support site (service center in FIG. 1). In the example illustrated in FIG. 3 it is further assumed that the live support session is ended either in response to the user of the corresponding apparatus (user apparatus in the site, or the service desk) providing such an input, or corresponding input is received from the other apparatus with which the live support session has been established. For the sake of clarity, in the illustrated example it is assumed that if one of the parties call, the other one answers to the call. It should be appreciated that if the other one rejects the call, or the alerting stops before the other party has answered the call, no connection is established for the call.

Referring to FIG. 3, the live support session is established in step 301, as described above with FIG. 2. After step 301, there is a session to the other apparatus and a connection to the drive. Then it is monitored, whether a user input is received (step 302: yes) via a user interface (UI) of the apparatus or as received information from the other apparatus (step 302: no).

If the user input is received via the user interface of the apparatus (step 302: yes), in the illustrated example it is assumed that the user input may relate to live chat, sharing images (images are used as an example of any data sharing, such as different documents, audio clips video clips, i.e. files of any type), to drive data, to a call (covering both a video call and a voice call) or to ending of a session.

If the user input relates to live chat (step 303: yes), the inputted information, comprising text and/or characters and/or icons, for example, is outputted in step 304 on the user interface of the apparatus and sending the information is caused in step 304 to the other apparatus, so that the other party chatting sees the same information. Then the process returns to monitor, whether a user input is received (step 302: yes) via the user interface of the apparatus or as received information from the other apparatus (step 302: no).

If the user input relates to images (step 303: no, step 305: yes), the user may be provided to select, whether to capture an image or use an existing image, and once the image is selected in step 306, either by capturing and/or selecting amongst existing images, or if an existing image is used, the image is outputted in step 306 on the user interface of the apparatus and sending the image is caused in step 306 to the other apparatus, so that the other party chatting sees the same image. Then the process returns to monitor, whether a user input is received (step 302: yes) or information from the other apparatus (step 302: no).

If the user input relates to drive data (step 305: no, step 307: yes), then the drive data is obtained and processed in step 308. For example, the remote application may cause reading (obtaining) fault codes and/or warnings and storing to the memory, setting parameters and/or service counters. The drive data may be shown to the user. Further, the remote application may cause showing the drive data to the user and/or forwarding the drive data to the service desk. In the service desk side, sending queries to obtain the drive data and/or parameter values and/or different instructions, like setting service counters, may be caused, for example. Then the process returns to monitor, whether a user input is received (step 302: yes) via the user interface of the apparatus or as received information from the other apparatus (step 302: no).

If the user input relates to a call (step 307: no, step 309: yes), it either indicates that the user wants to establish a call or end an ongoing call. Herein establishment covers answering to an alerting call, or triggering a call establishment. If the user wants to establish a call (step 310: yes) by responding to an alerting call, establishing the call to be carried over the existing session is caused in step 311, and then the parties (the user of the user apparatus and the operator of the service desk) may hear, and in case of a video call also see, each other. If the user wants to establish a call (step 310: yes) by triggering a call establishment, alerting the other party (or parties) is caused in step 311, ending eventually to establishing the call to be carried over the existing session, and then the parties (the user of the user apparatus and the operator of the service desk) may hear, and in case of a video call also see, each other. It should be appreciated that the call may use another communication path than the live support session even though the call is established to be carried over the existing session. Even, when there is an ongoing call, the process returns to monitor, whether a user input is received (step 302: yes) via the user interface of the apparatus or as received information from the other apparatus (step 302: no). If the user does not want to establish a call (step 310: no), the user want to end an existing call. Therefore releasing the extra resources reserved for the call is caused in step 312, the releasing including sending corresponding information to the other apparatus. Then the process returns to monitor, whether a user input is received (step 302: yes) via the user interface of the apparatus or as received information from the other apparatus (step 302: no).

If the user input indicates that the user wants to end the live support session (step 309: no), the live support session is ended in step 313. However, if the process is run in the user apparatus, the remote support application is still running, and its use according to prior art possibilities may continue.

If user input is received information from the other apparatus (step 302: no) in the illustrated example it is assumed that the received information may relate to live chat, sharing images (images are used as an example of any data sharing, such as different documents, files and/or videos), to drive data, to a call (covering both a video call and a voice call) or to ending of the session. Further, it should be appreciated that the received information from the other apparatus may actually be also something else than a user input of the user of the other apparatus, herein the received information is interpreted to correspond to actual user input.

If the information from the other apparatus relates to live chat (step 314: yes), the information is outputted in point 315 on the user interface so that the user sees what the other party is chatting. Then the process returns to monitor, whether a user input is received (step 302: yes) via the user interface of the apparatus or as received information from the other apparatus (step 302: no).

If the information from the other apparatus relates to images (step 314: no, step 316: yes), the image is outputted in point 315 on the user interface so that the user sees the image. Then the process returns to monitor, whether a user input is received (step 302: yes) via the user interface of the apparatus or as received information from the other apparatus (step 302: no).

If the information from the other apparatus relates to drive data (step 316: no, step 317: yes), the drive data is processed in step 318 accordingly. For example, the received drive data may be shown to the user. Further, the remote application may receive instructions to set parameters and/or service counters, and corresponding setting is caused, for example, or the remote application may receive an inquiry and reading (obtaining) fault codes and/or warnings and/or parameters, or corresponding settings, and forwarding them to the service desk is caused. In the service desk side, responses to queries to obtain the drive data and/or parameter values and/or different instructions, like setting service counters, may be received, for example, and processed correspondingly. Then the process returns to monitor, whether a user input is received (step 302: yes) via the user interface of the apparatus or as received information from the other apparatus (step 302: no).

If the information from the other apparatus relates to a call (step 317: no, step 319: yes), it either indicates that the other user wants to establish a call, and therefore either an alert or an acceptance is received, or the other user wants to end an ongoing call. If the received information indicates that the other user wants to establish a call (step 320: yes) and an alert is received, alerting is caused in step 321. If the received information indicates that the other user wants to establish a call and an acceptance is received (step 320: yes), a received user input answering to the call (alert) is detected in step 321 and therefore establishing the call to be carried over the existing session is caused in step 321. After that he parties (the user of the user apparatus and the operator of the service desk) may hear, and in case of a video call also see, each other. Even, when there is an ongoing call, the process returns to monitor, whether a user input is received (step 302: yes) via the user interface of the apparatus or as received information from the other apparatus (step 302: no). If the other user does not want to establish a call (step 320: no), the other user wants to end an existing call, and corresponding information is received. Therefore releasing the extra resources reserved for the call is caused in step 322. Then the process returns to monitor, whether a user input is received (step 302: yes) via the user interface of the apparatus or as received information from the other apparatus (step 302: no).

If the received information indicates that the other party wants to end the live support session (step 319: no), the live support session is ended in step 313, as described above.

As is evident from the above, the user's view may comprise images, sent chats, and received chats, for example, in any order. The live support unit, and the remote live support unit, aggregates the different media types. This facilitates finding a solution and receiving a general view, since everything is in the aggregated format, one does not need to jump between an email and a chat application. This in turns decreases the time, at least an average time, the drive cannot be in use. The shorter the time the drive is not in use, the better the productivity is.

It should be appreciated that the above illustrated different information types (media types) are only exemplary and it is a straightforward solution to implement the above description to other types of information. Any type of media format, including different multimedia formats, may be exchanged.

Since there is no need to close the remote support application to use another application, like capturing a picture and sending it via email, or to dial a number for phone service, time is saved and use of false addresses or false numbers is avoided (thanks to the application being up and running and knowing the addresses). This all decreases the time the drive cannot be in use, and as said above, this increases productivity.

The steps, points, related functions, and information exchanges described above by means of FIGS. 2 and 3 are in no absolute chronological order, and some of them may be performed simultaneously or in an order differing from the given one. Other functions can also be executed between them or within them, and other information may be sent. Some of the steps or points or part of the steps or points or one or more pieces of information can also be left out or replaced by a corresponding step, point or part of the step, point or one or more pieces of information. For example, it should be appreciated that the user input received via a user interface and/or as received information may relate only one, two or three of the examples mentioned above with FIG. 3, and/or further information exchange not expressly mentioned may be involved, using the above described principles.

The techniques and methods described herein may be implemented by various means so that a user apparatus/user device, a service desk/service desk device and/or a server/database server configured to support live remote support, that may be called also remote live user support, based on at least partly on what is disclosed above with any of FIGS. 2 and 3, including implementing one or more functions/operations of a corresponding user apparatus and/or service desk device and/or a server described above with an embodiment/example, for example by means of FIG. 2 or FIG. 3, comprises not only prior art means, but also means for implementing the one or more functions/operations of a corresponding functionality described with an embodiment, for example by means of FIG. 2 or FIG. 3, and it or they may comprise separate means for each separate function/operation, or means may be configured to perform two or more functions/operations. For example, one or more of the means and/or the remote tool unit, or at least the remote live support unit and/or the live support unit and/or the live feed unit described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIG. 2 or FIG. 3, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 4:
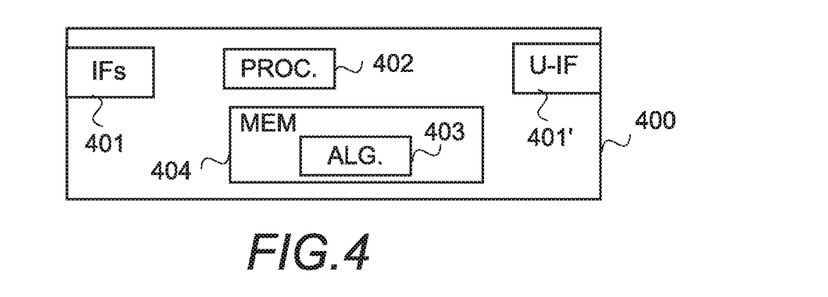
FIGS. 4, 5 and 6 are block diagrams of exemplary apparatuses.

FIG. 4 provides an apparatus according to some embodiments of the invention. FIG. 4 illustrates an apparatus configured to carry out the functions described above in connection with the user apparatus/user device. Each apparatus 400 may comprise one or more communication control circuitry, such as at least one processor 402, and at least one memory 404, including one or more algorithms 403, such as a computer program code (software) wherein the at least one memory and the computer program code (software) are configured, with the at least one processor, to cause the apparatus to carry out any one of the exemplified functionalities of the user apparatus. The apparatus may further comprise different communication interfaces 401 and one or more user interfaces 401'.

Referring to FIG. 4, at least one of the communication control circuitries in the apparatus 400 is configured to provide the remote tool unit, or at least the remote live support unit, or any corresponding sub-unit, and to carry out functionalities, described above by means of FIG. 2 or FIG. 3, by one or more circuitries.

Figure 5:
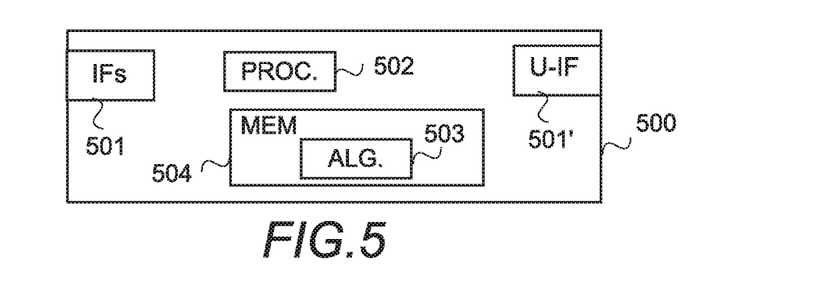

FIG. 5 provides an apparatus according to some embodiments of the invention. FIG. 5 illustrates an apparatus configured to carry out the functions described above in connection with the service desk. Each apparatus 500 may comprise one or more communication control circuitry, such as at least one processor 502, and at least one memory 504, including one or more algorithms 503, such as a computer program code (software) wherein the at least one memory and the computer program code (software) are configured, with the at least one processor, to cause the apparatus to carry out any one of the exemplified functionalities of the service desk. The apparatus may further comprise different communication interfaces 501 and one or more user interfaces 501'.

Referring to FIG. 5, at least one of the communication control circuitries in the apparatus 500 is configured to provide the live support unit, or any corresponding sub-unit, and to carry out functionalities, described above by means of FIG. 2 or FIG. 3, by one or more circuitries.

Figure 6:
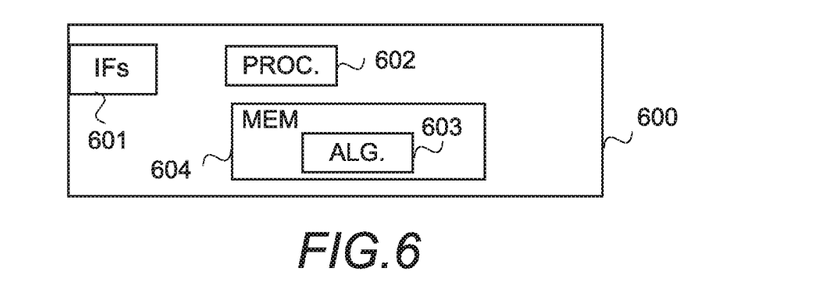

FIG. 6 provides an apparatus according to some embodiments of the invention. FIG. 6 illustrates an apparatus configured to carry out the functions described above in connection with the server. Each apparatus 600 may comprise one or more communication control circuitry, such as at least one processor 602, and at least one memory 604, including one or more algorithms 603, such as a computer program code (software) wherein the at least one memory and the computer program code (software) are configured, with the at least one processor, to cause the apparatus to carry out any one of the exemplified functionalities of the server. The memory 604 may comprise a database for storing different information, for example contact information on apparatuses, and information needed for maintenance. The apparatus may further comprise different communication interfaces 601.

Referring to FIG. 6, at least one of the communication control circuitries in the apparatus 600 is configured to provide the live feed unit or any corresponding sub-unit, and to carry out functionalities, described above by means of FIG. 2, by one or more circuitries.

The memory 404, 504, 604 or part of it may be implemented using any suitable data storage technology, such as semiconductor based memory devices, flash memory, magnetic memory devices and systems, optical memory devices and systems, fixed memory and removable memory.

The one or more communication interfaces (TX/RX) 401, 501, 601 may comprise hardware and/or software for realizing communication connectivity according to one or more communication protocols. The communication interface 401, 501, 601 may comprise standard well-known components such as an amplifier, filter, frequency-converter, (de) modulator, and encoder/decoder circuitries and one or more antennas. The communication interfaces 401, 501, 601 may comprise radio interface components and/or other wireless interface components providing the apparatus with wireless communication capability.

A user interface 401', 501' may be any kind of a user interface, for example a screen, microphone, headset, head-mounted display, and/or one or more loud-speakers for interaction with the user.

As used in this application, the term "circuitry" refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of "circuitry" applies to all uses of this term in this application. As a further example, as used in this application, the term "circuitry" would also cover an implementation of merely a processor (or multiple processors) or a portion of a processor and its (or their) accompanying software and/or firmware. The term "circuitry" would also cover, for example and if applicable to the particular element, a baseband integrated circuit or applications processor integrated circuit for a user apparatus or a similar integrated circuit in a service desk, or in a server.

In an embodiment, the at least one processor, the memory, and the computer program code form processing means or comprises one or more computer program code portions for carrying out one or more operations according to any one of the embodiments of FIG. 2 and FIG. 3 or operations thereof.

Embodiments as described may also be carried out in the form of a computer process defined by a computer program or portions thereof. Embodiments of the methods described in connection with FIG. 2 or FIG. 3 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and soft-ware distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is nor restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

It will be obvious to a person skilled in the art that, as technology advances, the inventive concept can be implemented in various ways. The invention and its embodiments are not limited to the examples described above but may vary within the scope of the claims.

What is claimed is:

1. A method comprising:
   starting in a first apparatus a remote support application, the remote support application containing address information to a remote support site;
   establishing a first connection for a first remote support session between the first apparatus and a second apparatus in the remote support site;
   detecting, while the first remote session is active between the first apparatus and the second apparatus, by the remote support application in the first apparatus an input requesting a live support session;
   causing sending, from the first apparatus to the second apparatus, within the first remote support session over the first connection between the first apparatus and the second apparatus, a request for the live support session;
   causing establishing, while maintaining the first connection between the first apparatus and the second apparatus and continuing to run the remote support application and the first remote support session, a second connection for the live support session between the first apparatus and a third apparatus in the remote support site, wherein the first remote support session and the live support session are parallel remote support sessions to and from the remote support application in the first apparatus and the first connection and the second connection are separate connections to the first apparatus, the first connection existing at least as long as the second connection exists;
   using the second connection for the live support session to exchange information over the live support session between the first apparatus and the third apparatus;
   establishing a third connection from the first apparatus to a fourth apparatus in a site in which the first apparatus is;
   receiving by the first apparatus in the live support session from the third apparatus a request to establish a fourth connection from the third apparatus to the fourth apparatus via the first apparatus;
   prompting a user of the first apparatus in the live support session to accept the fourth connection from the third apparatus to the fourth apparatus to be established via the first apparatus, wherein the fourth connection is a direct connection between the third apparatus and the fourth apparatus for information exchange without involvement of the user of the first apparatus; and
   allowing, in response to receiving a user input accepting the fourth connection, by the first apparatus, establishment of the fourth connection between the third apparatus and the fourth apparatus via the first apparatus.

2. The method of claim 1, further comprising:
   outputting in the first apparatus first information received from the third apparatus over the live support session and second information sent to the third apparatus over the live support session as an aggregate information regardless of a media type of the first information and a media type of the second information.

3. The method of claim 1, wherein the information exchanged includes one or more of a chat message, video call, image, video clip, audio clip and file.

4. A method comprising:
establishing a first connection for a first remote support session between a first apparatus and a second apparatus in a remote support site;
receiving over the first connection, from the first apparatus, by the second apparatus, a live support session request within the first remote support session;
causing sending, by the second apparatus, in response to receiving the live support session request, session establishment requests for the live support session to a plurality of third apparatuses connected to the second apparatus in the remote support site;
causing, by the second apparatus, in response to at least one third apparatus of the plurality of third apparatuses accepting a session establishment request for the live support session, establishing a second connection for the live support session between the first apparatus and one of the at least one third apparatus in the remote support site while maintaining the first remote support session, wherein the first remote support session and the live support session are parallel remote support sessions to and from a remote support application in the first apparatus and the first connection and the second connection are separate connections, the first connection existing at least as long as the second connection exists;
sending to the first apparatus in the live support session a request received from one of the at least one third apparatus of the plurality of third apparatuses to establish a fourth connection from the one third apparatus to a fourth apparatus in a site in which the first apparatus is via the first apparatus using a third connection established between the first apparatus and the fourth apparatus, wherein the fourth connection is a direct connection between the one third apparatus and the fourth apparatus for information exchange without involvement of a user of the first apparatus; and
establishing, in response to the first apparatus allowing after receiving a user input accepting the fourth connection, the fourth connection between the one third apparatus and the fourth apparatus via the first apparatus.

5. The method of claim 4, further comprising:
using the second connection for the live support session to exchange information over the live support session between the first apparatus and the third apparatus;
outputting in the third apparatus first information received from the first apparatus over the live support session and second information sent to the first apparatus over the live support session as an aggregate information regardless of a media type of the first information and a media type of the second information.

6. The method of claim 4, wherein the information exchanged includes one or more of a chat message, video call, voice call, image, video clip, audio clip and file.

7. A computer program product comprising a non-transitory computer-readable storage medium having stored thereon computer program instructions which, when run by at least one processor, cause the at least one processor to:
establish, when a remote support application, the remote support application containing address information to a remote support site, is started in a first apparatus comprising the at least one processor, a first connection for a first remote support session between the first apparatus and a second apparatus in the remote support site;
cause sending, in response to detecting by the remote support application an input requesting a live support session, from the first apparatus to the second apparatus within the first remote support session over the first connection a request for a second connection for the live support session;
cause establishing, while maintaining the first connection and continuing to run the remote support application and the first remote support session, a second connection for the live support session between the first apparatus and a third apparatus in the remote support site wherein the first remote support session and the live support session are parallel remote support sessions to and from the remote support application in the first apparatus and the first connection and the second connection are separate connections to the first apparatus, the first connection existing at least as long as the second connection exists;
use the second connection for the live support session to exchange information over the live support session between the first apparatus and the third apparatus;
cause establishing a third connection from the first apparatus to a fourth apparatus in a site in which the first apparatus is;
cause prompting, in response to receiving by the first apparatus in the live support session from the third apparatus a request to establish a fourth connection from the third apparatus to the fourth apparatus via the first apparatus, a user of the first apparatus in the live support session to accept the fourth connection from the third apparatus to the fourth apparatus to be established via the first apparatus, wherein the fourth connection is a direct connection between the third apparatus and the fourth apparatus for information exchange without involvement of the user of the first apparatus; and
allow, in response to receiving a user input accepting the fourth connection, by the first apparatus, establishment of the fourth connection between the third apparatus and the fourth apparatus via the first apparatus.

8. A computer program product comprising a non-transitory computer-readable storage medium having stored thereon computer program instructions which, when run by at least one processor, cause the at least one processor to:
establish a first connection for a first remote support session between a first apparatus and a second apparatus in a remote support site, the second apparatus comprising the at least one processor;
cause, in response to receiving by the second apparatus over the first connection, from the first apparatus, by the second apparatus, a live support session request within the first remote support session, the second apparatus to send session establishment requests for the live support session to a plurality of third apparatuses connected to the second apparatus in the remote support site;
cause, in response to at least one third apparatus of the plurality of the third apparatuses accepting a session establishment request for the live support session, establishing a second connection for the live support session between the first apparatus and one of the at least one third apparatus in the remote support site while maintaining the first remote support session, wherein the first remote support session and the live support session are parallel remote support sessions to and from a remote support application in the first apparatus and the first connection and the second connection are separate connections to the first apparatus, the first connection existing at least as long as the second connection exists;

cause sending to the first apparatus in the live support session a request received from one of the at least one third apparatus of the plurality of third apparatuses to establish a fourth connection from the one third apparatus to a fourth apparatus in a site in which the first apparatus is via the first apparatus using a third connection established between the first apparatus and the fourth apparatus, wherein the fourth connection is a direct connection between the one third apparatus and the fourth apparatus for information exchange without involvement of a user of the first apparatus; and cause establishing, in response to the first apparatus allowing after receiving a user input accepting the fourth connection, the fourth connection between the one third apparatus and the fourth apparatus via the first apparatus.

9. A user apparatus comprising at least one processor, and at least one memory including computer program code, wherein the at least one memory and the computer program code are configured to, with the at least one processor, cause the user apparatus at least to:

start in the user apparatus a remote support application, the remote support application containing address information to a remote support site;

establish a first connection for a first remote support session between the user apparatus and a second apparatus in the remote support site;

send, in response to detecting by the remote support application in the user apparatus an input requesting a live support session, from the user apparatus to the second apparatus within the first remote support session over the first connection between the user apparatus and the second apparatus a request for the live support session;

establish, while maintaining the first connection between the user apparatus and the second apparatus and continuing to run the remote support application and the first remote support session, a second connection for the live support session between the user apparatus and a third apparatus in the remote support site, wherein the first remote support session and the live support session are parallel remote support sessions to and from the remote support application in the user apparatus and the first connection and the second connection are separate connections to the user apparatus, the first connection existing at least as long as the second connection exists; and use the second connection for the live support session to exchange information over the live support session between the user apparatus and the second apparatus;

establish a third connection from the user apparatus to a fourth apparatus in a site in which the user apparatus is;

prompt, in response to receiving by the user apparatus in the live support session from the third apparatus a request to establish a fourth connection from the third apparatus to the fourth apparatus via the user apparatus, a user of the user apparatus in the live support session to accept the fourth connection from the third apparatus to the fourth apparatus to be established via the user apparatus, wherein the fourth connection is a direct connection between the third apparatus and the fourth apparatus for information exchange without involvement of the user of the user apparatus; and allow, in response to receiving a user input accepting the fourth connection, by the user apparatus, establishment of the fourth connection between the third apparatus and the fourth apparatus via the user apparatus.

10. The user apparatus of claim 9, wherein the at least one memory and the computer program code are configured to, with the at least one processor, further cause the user apparatus at least to output in the user apparatus first information received from the third apparatus over the live support session and second information sent to the third apparatus over the live support session as an aggregate information regardless of a media type of the first information and a media type of the second information.

11. A server apparatus in a remote support site, the server apparatus comprising at least one processor, and at least one memory including computer program code, wherein the at least one memory and the computer program code are configured to, with the at least one processor, cause the server apparatus at least to:

establish a first connection for a first remote support session between a first apparatus and the server apparatus;

cause, in response to receiving by the server apparatus over the first connection, from the first apparatus, a live support session request within the first remote support session, sending from the server apparatus session establishment requests for the live support session to a plurality of third apparatuses connected to the server apparatus in the remote support site;

cause, in response to at least one third apparatus of the plurality of the third apparatuses accepting a session establishment request for the live support session, establishing a second connection for the live support session between the first apparatus and one third apparatus of the at least one third apparatus in the remote support site while maintaining the first remote support session active, wherein the first remote support session and the live support session are parallel remote support sessions to and from a remote support application in the first apparatus and the first connection and the second connection are separate connections to the first apparatus, the first connection existing at least as long as the second connection exists;

cause sending to the first apparatus in the live support session a request received from one of the at least one third apparatus of the plurality of third apparatuses to establish a fourth connection from the one third apparatus to a fourth apparatus in a site in which the first apparatus is via the first apparatus using a third connection established between the first apparatus and the fourth apparatus, wherein the fourth connection is a direct connection between the one third apparatus and the fourth apparatus for information exchange without involvement of a user of the first apparatus; and cause establishing, in response to the first apparatus allowing after receiving a user input accepting the fourth connection, the fourth connection between the one third apparatus and the fourth apparatus via the first apparatus.

12. A system comprising at least:

one or more sites, a site comprising one or more devices, a device comprising one or more wireless interfaces to enable local connections;

one or more service centers, a service center providing a remote support site, comprising at least a server and a plurality of service desks connected to the server, and being configured to support remote maintenance of at least the one or more devices and to establish simultaneously existing connections to the site, the server being configured to cause, in response to receiving within an existing remote maintenance session over a first connection between the server and a user apparatus in the site from the user apparatus a live support session request, sending from the server session establishment requests for the live support session to the plurality of service desks, and cause, in response to at least one service desk of the plurality of the service desks accepting a session establishment request for a live remote session is received, establishment of a second connection for the live remote session between the user apparatus and one service desk of the at least one service desk while maintaining the existing remote maintenance session and the first connection; a service desk being configured to receive from the server the session establishment request for the live support session, to accept the session establishment request and to establish the second connection for the live remote session, wherein the first connection and the second connection are separate connections from the service center to the user apparatus, the first connection existing at least as long as the second connection exists; and one or more user apparatuses, the user apparatus being configured to establish the first connection for a first remote maintenance session to the server in the service center amongst the one or more service centers, to establish a local connection to at least one of the one or more devices when the user apparatus is located in the site, and to send over the first connection to the server in the service center the request for establishing the live remote session within the existing first remote maintenance session, to establish, while maintaining the first remote maintenance session and the first connection, the second connection for the live remote session to the service desk in the service center, wherein the first remote maintenance session and the live remote session are parallel remote maintenance sessions in the user apparatus and the first connection and the second connection are separate connections to the user apparatus, the first connection existing at least as long as the second connection exists, to establish a third connection from the user apparatus to one of the one or more devices in a site in which the user apparatus is; to prompt, in response to receiving by the user apparatus in the live support session a request, originating from the service desk, to establish a fourth connection from the service desk to the one device via the user apparatus, a user of the user apparatus in the live support session to accept the fourth connection from the service desk to the one device to be established via the user apparatus, wherein the fourth connection is a direct connection between the service desk and the one device for information exchange without involvement of the user of the user apparatus; and to allow, in response to receiving a user input accepting the fourth connection, establishment of the fourth connection between the service desk and the one device via the user apparatus.

13. The system of claim 12, wherein the information exchanged over the live remote session includes one or more of a chat message, video call, voice call, image, video clip, audio clip and file;

the user apparatus is further configured to output first information received from the one of the one or more service desks over the live support session and second information sent to the one of the one or more service desks over the live support session as an aggregate information regardless of a media type of the first information and a media type of the second information; and the one or more service desks are configured to output the second information received from the user apparatus over the live support session and the first information sent to the user apparatus over the live support session as an aggregate information regardless of the media type of the first information and the media type of the second information.

14. The system of claim 12, wherein the one or more sites are industrial sites; and the one or more devices are drives.

\* \* \* \* \*